(12) United States Patent
Lee (10) Patent No.: US 10,271,657 B2
(45) Date of Patent: Apr. 30, 2019

(54) FOAM FURNITURE MOLDED AROUND A HOLLOW SHELL OF HARD PLASTIC

(71) Applicant: Zinus Inc., San Leandro, CA (US)

(72) Inventor: Youn Jae Lee, Pleasanton, CA (US)

(73) Assignee: Zinus Inc., Tracy, CA (US)

( * ) Notice: Subject to any disclaimer, the term of this patent is extended or adjusted under 35 U.S.C. 154(b) by 256 days.

(21) Appl. No.: 15/224,667

(22) Filed: Aug. 1, 2016

(65) Prior Publication Data

US 2016/0338493 A1  Nov. 24, 2016

Related U.S. Application Data

(63) Continuation of application No. 14/093,222, filed on Nov. 29, 2013, now Pat. No. 9,420,890.

(51) Int. Cl.
| | |
|---|---|
| *B29D 99/00* | (2010.01) |
| *A47C 5/12* | (2006.01) |
| *A47C 3/16* | (2006.01) |
| *A47C 7/18* | (2006.01) |
| *B29C 44/00* | (2006.01) |

(Continued)

(52) U.S. Cl.
CPC .............. *A47C 5/12* (2013.01); *A47C 3/16* (2013.01); *A47C 7/185* (2013.01); *B29C 44/00* (2013.01); *B29C 44/08* (2013.01); *B29C 44/1266* (2013.01); *B29C 49/0047* (2013.01); *B29D 99/0092* (2013.01); *B29K 2007/00* (2013.01); *B29K 2023/12* (2013.01);

(Continued)

(58) Field of Classification Search
CPC ... A47C 5/12; B29C 49/0047; B29C 44/1266; B29C 44/08; B29C 44/00; Y10T 29/48; Y10T 29/481; Y10T 29/4998; Y10T 29/49982; Y10T 29/49984
See application file for complete search history.

(56) References Cited

U.S. PATENT DOCUMENTS

| 2,880,428 A | 4/1959 | Forsland ........................ 5/636 |
| 3,161,436 A | 12/1964 | Hood ...................... 297/452.27 |

(Continued)

FOREIGN PATENT DOCUMENTS

| CN | 2081676 U | 7/1991 |
| CN | 1273979 A | 11/2000 |

(Continued)

*Primary Examiner* — Jason L Vaughan
*Assistant Examiner* — Amanda J Meneghini
(74) *Attorney, Agent, or Firm* — Imperium Patent Works; Darien K. Wallace (57) ABSTRACT

A foam seating article includes a layer of molded foam surrounding a hollow shell made of hard plastic. A fabric covering encloses the shell and molded foam. The foam seating article can take the form of a chair, stool, sofa, chaise lounge, bench or Ottoman. The hollow shell can be formed using blow molding, injection molding or by capping both ends of a tube with disks. Air pressure inside the airtight hollow shell prevents the shell from collapsing inwards under the weight of an occupant. Alternatively, the hollow shell of the seating article can be accessed through a removable lid. The seating article includes no wood or metal. The layer of molded foam includes sections of different foam types, such as high density (HD) foam, memory foam and latex foam. Molding foam around a hard plastic shell is simpler and less costly than making conventional metal or wood framed furniture.

20 Claims, 12 Drawing Sheets

(51) Int. Cl.
*B29C 44/08* (2006.01)
*B29C 44/12* (2006.01)
*B29C 49/00* (2006.01)
B29K 101/00 (2006.01)
B29K 7/00 (2006.01)
B29K 23/00 (2006.01)
B29K 105/04 (2006.01)
B29L 31/00 (2006.01)

(52) U.S. Cl.
CPC ...... *B29K 2101/00* (2013.01); *B29K 2105/04* (2013.01); *B29K 2313/00* (2013.01); *B29L 2031/751* (2013.01)

(56) References Cited

U.S. PATENT DOCUMENTS

| | | | |
|---|---|---|---|
| 3,325,214 A * | 6/1967 | McQueeney | A47C 7/38 297/391 |
| 3,543,315 A | 12/1970 | Hoffman | 9/310 |
| 3,556,586 A | 1/1971 | Beardmore | 297/3 |
| 3,620,570 A | 11/1971 | Wilson et al. | 297/451.12 |
| 3,719,185 A | 3/1973 | Hanes | 128/69 |
| 3,761,130 A | 9/1973 | Suzuki et al. | 297/445 |
| 3,842,453 A | 10/1974 | Redfield | 5/340 |
| 4,118,813 A | 10/1978 | Armstrong | 5/638 |
| 4,258,952 A | 3/1981 | Dutra | 297/258 |
| 4,471,993 A | 9/1984 | Watson | 297/230 |
| 4,858,994 A | 8/1989 | Yamashita | 297/391 |
| 4,902,003 A | 2/1990 | Buoni | 482/140 |
| 4,988,090 A | 1/1991 | Schmitt | 272/56.5 |
| 5,116,557 A | 5/1992 | Debaes et al. | 264/46.6 |
| 5,240,528 A | 8/1993 | Pagni | 156/79 |
| 5,316,372 A * | 5/1994 | Amner | B29C 44/1233 297/408 |
| 5,415,461 A | 5/1995 | Sakamoto | 297/440.1 |
| 5,474,362 A | 12/1995 | Albecker | 297/452.32 |
| 5,744,231 A | 4/1998 | Igarashi et al. | 428/318.6 |
| 5,778,469 A | 7/1998 | Festa | 5/640 |
| 5,801,211 A | 9/1998 | Tornero et al. | 521/159 |
| 5,857,742 A | 1/1999 | Karl et al. | 297/248 |
| 5,967,612 A | 10/1999 | Takei | 297/391 |
| 6,022,205 A | 2/2000 | Marlowe | 425/4 |
| 6,183,045 B1 | 2/2001 | Marfilius et al. | 297/391 |
| 6,360,387 B1 * | 3/2002 | Everhart | A47C 20/027 5/490 |
| 6,457,773 B1 | 10/2002 | Gates | 297/228.12 |
| 6,684,433 B2 | 2/2004 | Giori et al. | 5/709 |
| 6,702,391 B1 | 3/2004 | Stipek | 297/452.65 |
| 6,726,284 B2 | 4/2004 | Cleary | 297/411.45 |
| 6,840,584 B2 | 1/2005 | Rocheford | 297/451.6 |
| 6,877,817 B1 | 4/2005 | Brown | 297/461 |
| 6,997,513 B2 | 2/2006 | Ige et al. | 248/174 |
| 7,083,173 B2 | 8/2006 | Lehr et al. | 280/28.16 |
| 7,108,646 B1 | 9/2006 | Quick | 482/148 |
| 7,201,625 B2 | 4/2007 | Yeh | 441/65 |
| 7,571,965 B1 | 8/2009 | Perry | 297/452.26 |
| 7,998,031 B2 | 8/2011 | Dumke et al. | 482/55 |
| 8,141,957 B2 | 3/2012 | McClung et al. | 297/452.27 |
| 8,158,249 B2 | 4/2012 | Greer | 428/319.3 |
| 8,318,283 B2 | 11/2012 | Hsu | 428/71 |
| 8,398,166 B2 | 3/2013 | Lindsay et al. | 297/216.1 |
| 8,496,860 B2 | 7/2013 | Varner et al. | 264/45.7 |
| 2002/0151233 A1 * | 10/2002 | Renard | B63B 35/7909 441/65 |
| 2003/0233694 A1 | 12/2003 | Wescombe-Down | 2/2.15 |
| 2004/0026970 A1 | 2/2004 | Vassar et al. | 297/218.1 |
| 2006/0145526 A1 | 7/2006 | Neikel et al. | 297/452.14 |
| 2007/0283865 A1 | 12/2007 | Railey | 114/55.58 |
| 2008/0292830 A1 | 11/2008 | Greer | 428/71 |
| 2011/0008608 A1 | 1/2011 | Bellin et al. | 428/305.5 |
| 2011/0094033 A1 * | 4/2011 | Lee | A61F 5/56 5/636 |
| 2011/0192564 A1 | 8/2011 | Mommer et al. | 165/10 |
| 2011/0256369 A1 * | 10/2011 | Switzer | A47C 27/001 428/215 |
| 2011/0293914 A1 | 12/2011 | Maurer et al. | 428/304.4 |
| 2013/0049389 A1 * | 2/2013 | Hipshier | B29C 44/086 296/1.08 |
| 2013/0062922 A1 | 3/2013 | Dickson | 297/423.1 |
| 2013/0104787 A1 | 5/2013 | Roman | 114/55.56 |

FOREIGN PATENT DOCUMENTS

| | | |
|---|---|---|
| EP | 0044083 | 1/1982 |
| EP | 0179043 | 4/1986 |
| FR | 2996809 | 4/2014 |
| JP | 58185235 | 10/1983 |
| JP | 05095847 A | 4/1993 |

* cited by examiner

FOAM FURNITURE MOLDED AROUND A HOLLOW SHELL OF HARD PLASTIC

CROSS REFERENCE TO RELATED APPLICATION

This application is a continuation of, and claims priority under 35 U.S.C. § 120 from, nonprovisional U.S. patent application Ser. No. 14/093,222 entitled "Foam Furniture Molded Around A Hollow Shell Of Hard Plastic," filed on Nov. 29, 2013, the subject matter of which is incorporated herein by reference.

TECHNICAL FIELD

The present invention relates generally to upholstered furniture for seating and, more particularly, to furniture made by molding foam around a hollow inner shell of hard plastic.

BACKGROUND

Conventional upholstered furniture for seating is made by placing padding and upholstery around a weight-bearing frame. The frame is made primarily by joining linear members of wood or metal. Often springs are also used to provide a cushioned seating surface. It is a challenge to use conventional materials to make furniture that is not mostly rigid with linear sections. Thus, making a rounded frame by bending metal and shaping wood and then adding springs, padding and upholstery is labor intensive and costly. Moreover, the wood or metal frames are usually heavy, which adds to the cost of transportation.

Foam is sometimes used as one of the padding components of upholstered furniture. However, foam that is suitably soft to cushion seating furniture cannot also provide sufficient structural integrity to support the structure of the furniture. Using harder foam as the frame for foam seating furniture also provides insufficient support. A method is sought for making seating furniture using foam as the upholstery padding that does not require a heavy wood or metal frame.

SUMMARY

A foam seating article includes a layer of molded foam surrounding a hollow shell made of hard plastic. A covering encloses the molded foam and the shell. The covering is made of woven fabric, nonwoven fabric, leather, or a conformal plastic layer. The foam seating article can take the form of a chair, stool, sofa, chaise lounge, bench or Ottoman. The hollow shell can be formed using blow molding, injection molding or by capping both ends of a tube with disks. The hard plastic shell is made of polypropylene, polyethylene, polyvinyl chloride (PVC), polyvinyl acetate (PVA) or a thermoplastic elastomer (TPE). The hollow shell has an uneven outer surface with dimples, grooves or crevices to which the foam of the molded foam layer adheres.

Air pressure inside the airtight hollow shell prevents the shell from collapsing inwards under the weight of an occupant. Alternatively, the hollow shell of the seating article can be accessed through a removable top plug. The seating article includes no wood or metal. The layer of molded foam includes sections of different foam types, such as high density (HD) foam, memory foam and latex foam.

Molding foam around a hard plastic shell is simpler and less costly than manufacturing furniture with the conventional process of shaping metal and wood to make a frame and then adding springs, padding and upholstery. And it is easier to make curved shapes by molding the inner shell and outer foam than it is to make a curved inner frame from wood or metal.

A foam seating article is manufactured by blow molding a hollow shell of hard plastic. Alternatively, the shell is formed using by injection molding or by attaching disks to both ends of a tube. When blow molding is used to make the shell, a tube of resin is placed inside a mold and sealed at both ends. Air is blown into the resin tube such that the resin expands outwards and takes the shape of the interior of the mold. The resin tube is then cured, and the cured resin shell is removed from the mold.

The hollow shell is placed in a second mold, and foam is molded around the outer surface of hollow shell. Liquid foam precursors are injected into the space between the shell and the inner walls of the second mold. Different kinds of foams are successively poured into the second mold, such as an extra hard foam with an ILD of about twenty, and HD foam with an ILD of about fifteen, and a memory foam with an ILD of about twelve. The liquid foam precursors of the molded foam layer are cured, and the foam and enclosed shell are removed from the second mold.

A covering is then placed around the molded foam layer and the hollow shell. The covering is made of woven fabric, nonwoven fabric, leather or a conformal plastic or rubber layer.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
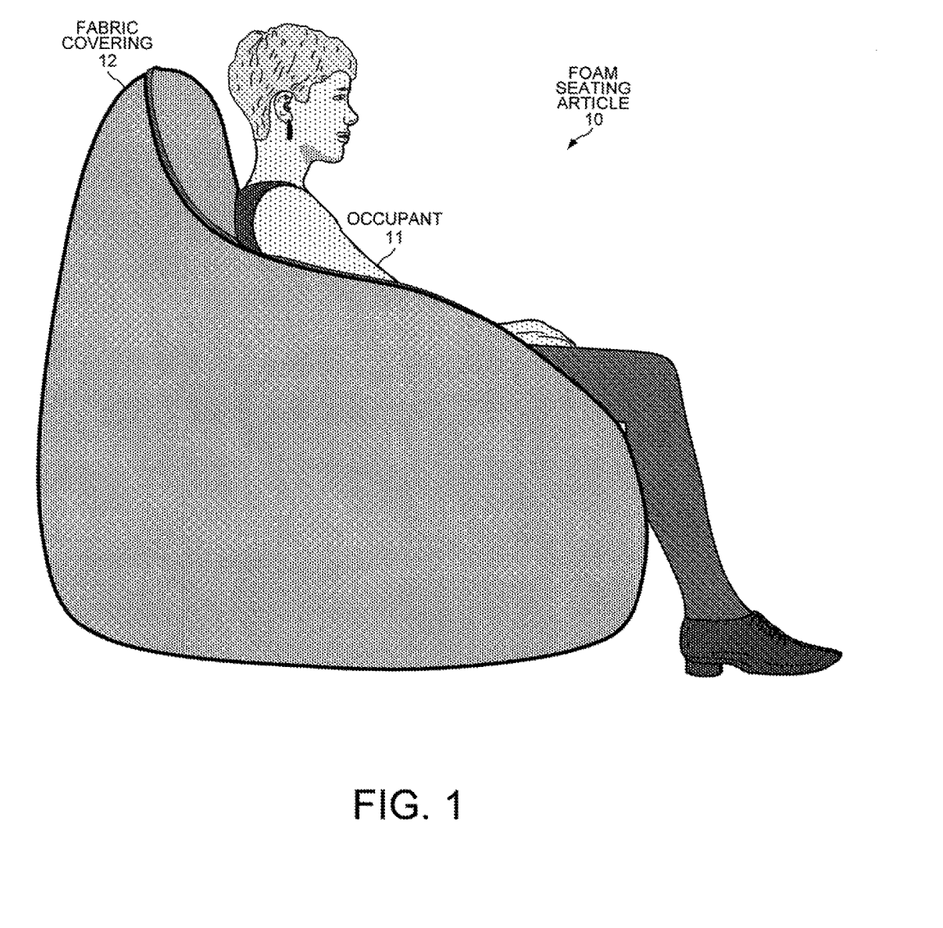
FIG. 1 is a perspective view of an occupant seated in a foam seating article made by molding foam around a hollow, hard plastic shell.

The present invention is generally directed towards chairs. However, the invention disclosed herein can be successfully used in connection with other types of seating furniture such as sofas, chaise lounges, benches, Ottomans, and the like. FIG. 1 shows a foam seating article 10 in the form of a chair that is sized and configured to allow a single person to use the chair at one time. But other configurations of chair 10 could be sized and configured to allow two or more persons to sit on the chair at the same time. Chair 10 has a thick layer of molded memory foam surrounding a hollow shell of hard plastic. Thus, much of the inner volume of chair 10 is air. The hollow shell is made airtight in order to increase the rigidity of the hard plastic shell. For example, a shell of polypropylene can provide sufficient support with a thickness of only three millimeters if the hollow shell is completely enclosed. The major weight component of chair 10 is the layer of molded memory foam that surrounds the hollow shell. Nevertheless, chair 10 still weighs much less than an equivalently sized chair with an inner wood or metal frame.

FIG. 1 shows an occupant 11 comfortably seated in foam seating article 10. A woven fabric covering 12 surrounds the memory foam. In other embodiments, chair 10 has a covering made of nonwoven fabric, leather or even a conformal plastic layer.

Figure 2:
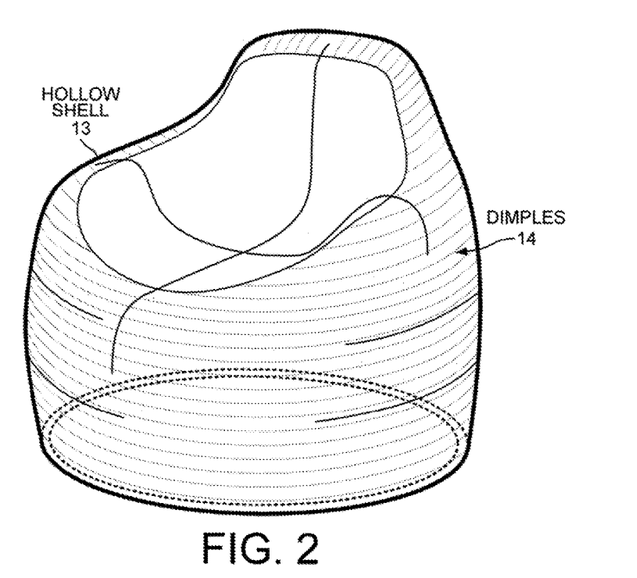
FIG. 2 shows the hollow, hard plastic shell that forms a frame inside the seating article of FIG. 1.

FIG. 2 shows the hollow shell 13 of hard plastic around which the thick layer of memory foam is molded to form chair 10. Shell 13 is formed by blow molding a thermoplastic resin into a first mold. The thermoplastic resin is first extruded in the form of a tube or sheet, which is then expanded by blowing air into the tube inside a blow mold. The thermoplastic resin can be polypropylene (PP) resin, polyethylene (PE) resin, acrylonitrile butadiene styrene (ABS) resin, polyvinyl chloride (PVC) resin, polyvinyl acetate (PVA) resin, polycarbonate resin, polyamide resin, a polyphenylene oxide resin or a blend of these resins.

In the embodiment of FIG. 2, shell 13 is made from a tube of 3-millimeter thick plasticized polypropylene (PP) resin. The tube is placed inside the first mold and then sealed at both ends. The two halves of the first mold are then closed. Air is blown into the tube such that the blown up tube takes the shape of the interior of the first mold. For example, air can be blown into the tube through an injection needle that punctures the tube. The needle passes through both the first mold and the tube of resin. The first mold includes small escape holes that allow the air trapped between the walls of the mold cavity and the resin tube to escape as the tube is filled with air and expands outwards to the walls of the mold. The sealed resin tube entirely covers the inside walls of the first mold. The resin tube is then cured and hardens when it is heated. The two halves of the first mold are then opened, and the cured resin tube is removed from the mold. The cured resin tube forms shell 13. The tiny hole made by the injection needle is glued closed such that the shell 13 is air tight. The air pressure inside shell 13 provides added strength and helps to prevent the shell from collapsing inwards under the weight of occupant 11.

Foam is later molded around the outer surface of shell 13. In the embodiment in which shell 13 is made of polypropylene surrounded by visco-elastic polyurethane foam (memory foam), the foam naturally sticks to the surface of the shell. In other embodiments, however, it is advantageous to generate additional adhesion between the shell and the foam by forming an uneven outer surface on the shell to which the foam can better attach. For example, dimples, grooves or crevices can be formed on the outside surface of shell 13 by providing micro-bumps or ribs on the inside surface of the first mold. The molded foam then sets up inside the dimples, grooves and crevices and becomes even more attached to shell 13. FIG. 2 shows rows of dimples 14 that have been formed in the outer surface of shell 13.

Figure 3:
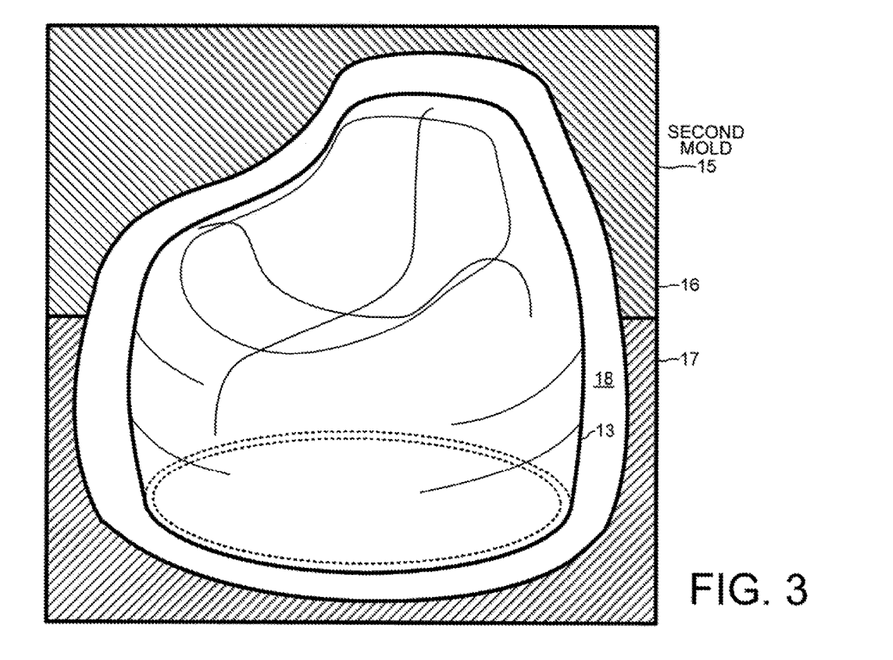
FIG. 3 illustrates the hard plastic shell of FIG. 2 inside a mold for foam.

FIG. 3 illustrates how foam is molded around shell 13 by placing the shell inside a second mold 15. Second mold 15 has multiple sections, such as the top half 16 and bottom half 17 shown in FIG. 3. In other embodiments, the second mold has a right half and a left half, or the second mold has more than two sections. After shell 13 is placed inside bottom half 17, top half 16 is closed. A foam precursor mixture is then injected into the space 18 between shell 13 and the inner mold walls. In one embodiment, two kinds of foam are molded around shell 13. First, "high density" (HD) polyurethane foam is poured into space 18 in second mold 15 until about the bottom half of the mold cavity is filled. Second, visco-elastic memory foam is then poured into the remaining space between shell 13 and the inner mold walls. Latex can be used instead of memory foam in the remaining space. The molded foam is then allowed to set, and the second mold 15 is removed.

In another embodiment, an extra hard foam can be added first such that the bottom several inches of chair 10 have a more durable base. The indentation load deflection (ILD) is one measure of foam hardness. The extra hard bottom foam layer can have an ILD of about twenty, while the HD foam has an ILD of fifteen, and the memory foam has an ILD of twelve. The "high density" HD foam is somewhat of a misnomer because the memory foam has a higher density than does the HD foam. Density and hardness are not synonymous. Generally, denser foam is more durable. Typically, the HD foam used for cushioning has a density of between 1.5 to 2.5 pounds per cubic foot, whereas memory foam typically has a density between three and 5.5 pounds per cubic foot. Memory foam is temperature sensitive. At room temperature memory foam is harder than at skin temperature. Memory foam softens on contact and molds itself to the shape of a warm body within a few minutes. As occupant 11 sits on the memory foam that covers the top of chair 10, the foam becomes softer, more pliant and more elastic.

Figure 4:
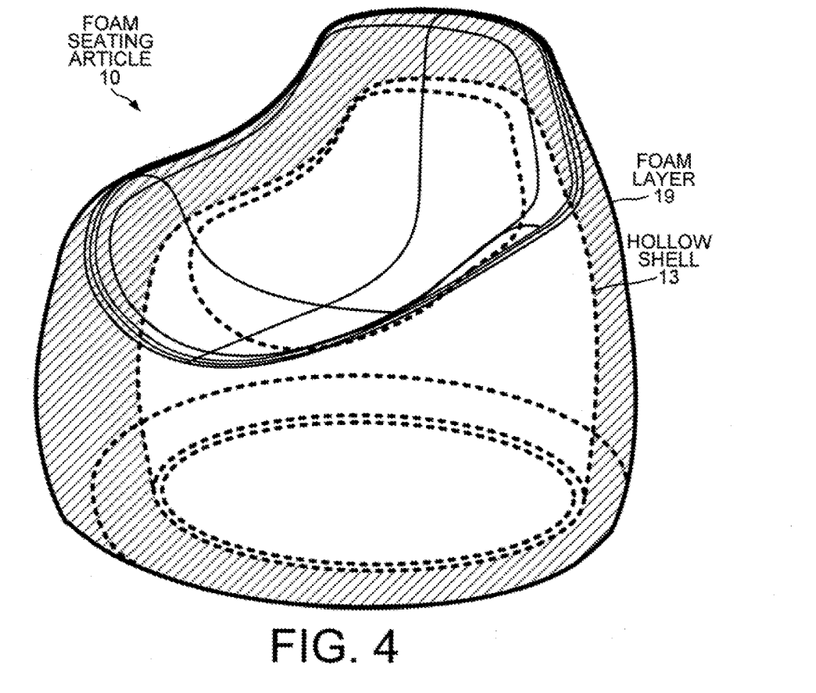
FIG. 4 is a perspective view of the foam seating article of FIG. 1 after being removed from the mold of FIG. 3 and before a fabric covering is added.

FIG. 4 shows foam seating article 10 after being removed from second mold 15 and before fabric covering 12 has been added. A layer of molded foam 19 surrounds hollow shell 13. The thickness of molded foam layer 19 is about equal around shell 13 except on the bottom, where layer 19 is thinner.

Figure 5:
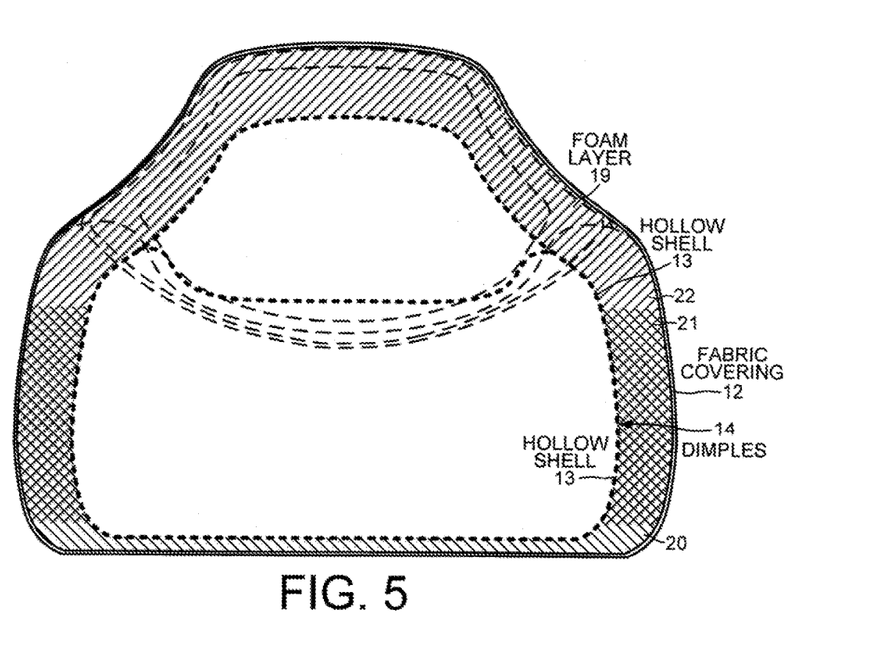
FIG. 5 is a cross-sectional view of the seating article of FIG. 4 showing the thickness of the molded foam layer around the shell.

FIG. 5 is a cross-sectional view of chair 10 showing the thickness of molded foam layer 19. Layer 19 includes a hard foam base portion 20, an HD foam bottom portion 21 and a memory foam top portion 22. The precursors of the different types of foam are poured into second mold 15 in a liquid state and cure together. Thus, no adhesive is required to bind the three foam portions together. Molded foam layer 19 naturally sticks to hard plastic shell 13. However, the molded foam that flows into the dimples 14 in the outside surface of shell 13 provides additional bonding of layer 19 to shell 13.

Figure 6:
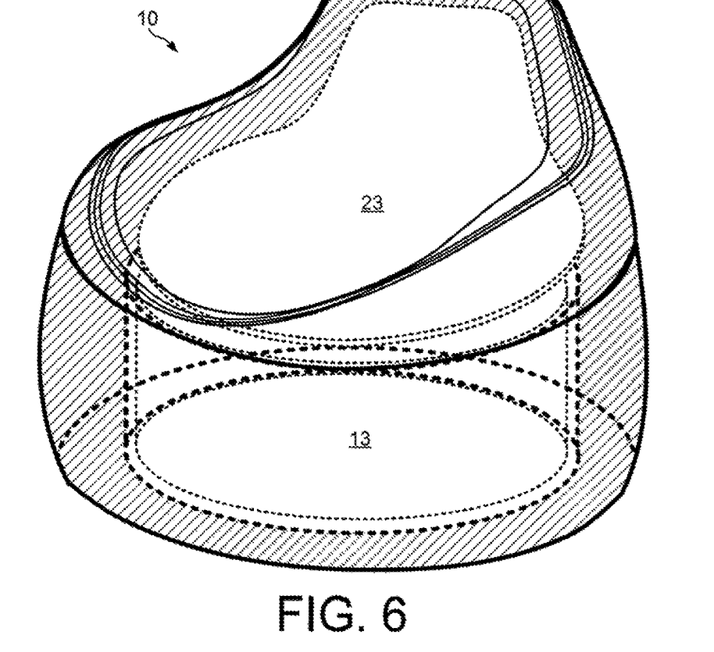
FIG. 6 is a perspective view of another embodiment of a foam seating article in which the inner shell includes both a curved sitting surface that is not hollow and a hollow cylindrical portion.
Figure 7:
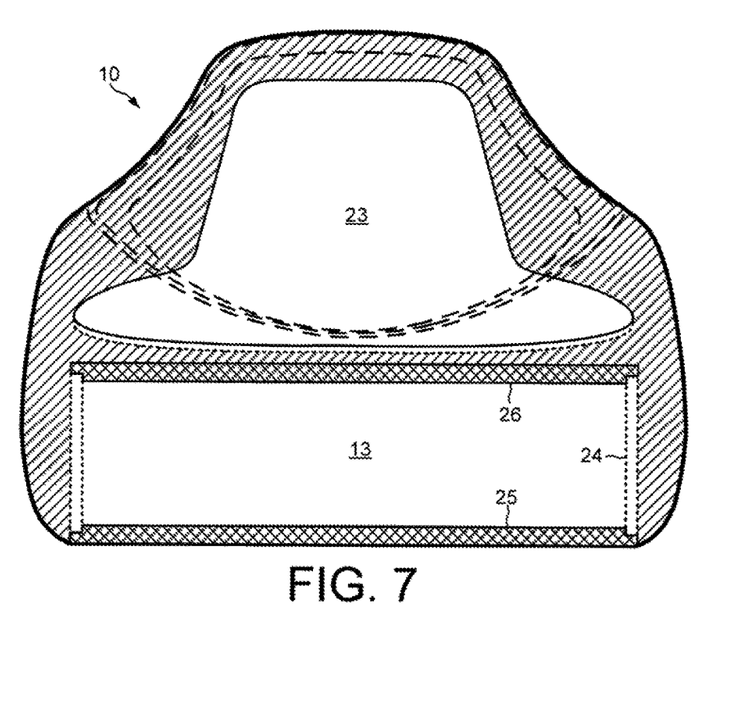
FIG. 7 is a cross-sectional view of the foam seating article of FIG. 6.

FIGS. 6-7 show another embodiment of foam seating article 10 in which hollow shell 13 is cylindrical, and the thickness of molded foam layer 19 is not equal around shell 13. In addition to hollow shell 13, there is a second hard plastic portion 23 about which foam is molded. Second portion 23 is not hollow. Instead, second portion 23 is shaped as a curved sitting surface suspended above the cylindrical hollow shell 13. Hard plastic portion 23 is held in place within second mold 15 while the foam sets up around it. Neither shell 13 nor portion 23 is blow molded. Portion 23 can be injection molded. Shell 13 is a tube 24 that is capped at both ends by plugs 25-26. Tube 24 is extruded polyvinyl chloride (PVC), polyvinyl acetate (PVA), polypropylene, polyethylene or a thermoplastic elastomer (TPE). The plugs 25-26 are shaped as lipped disks that are glued over the ends of tube 24 forming an airtight seal.

Figure 8:
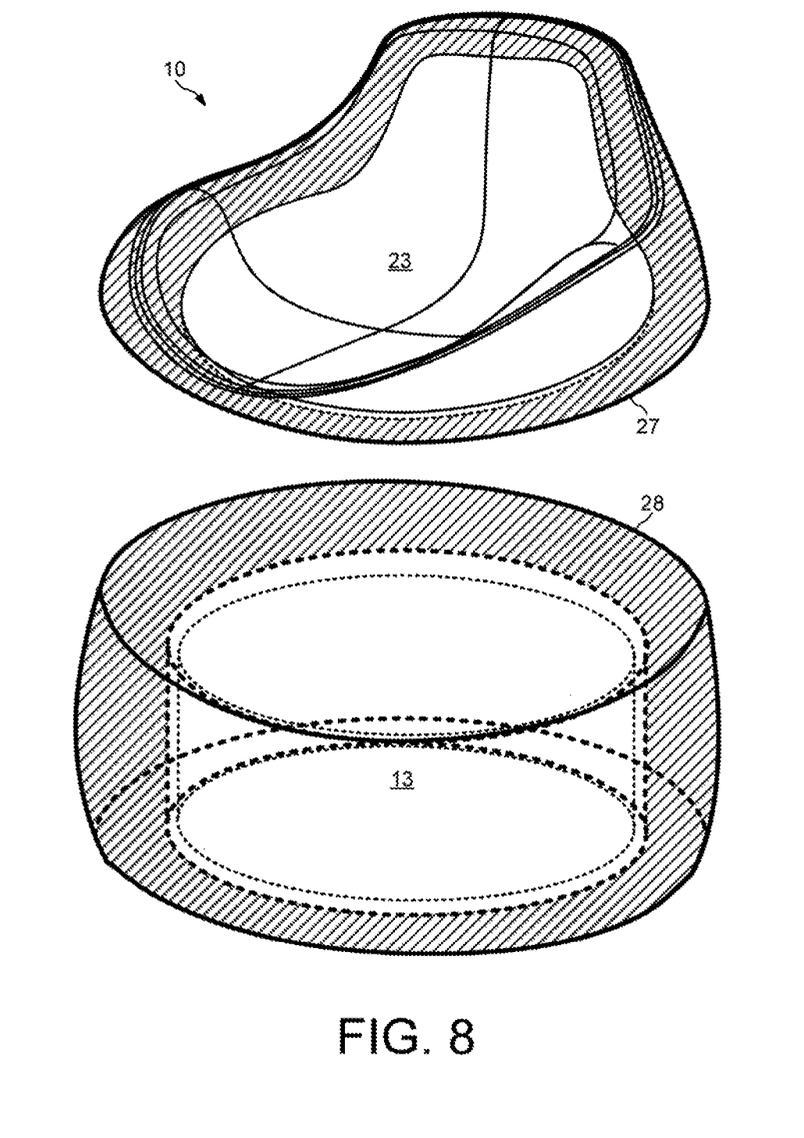
FIG. 8 is an exploded view of the foam seating article of FIG. 6.

FIG. 8 shows an exploded view of foam seating article 10 of FIG. 6-7. A top portion 27 of molded foam layer 19 is shown surrounding second portion 23 of hard plastic. A bottom portion 28 of molded foam layer 19 is shown surrounding cylindrical hollow shell 13.

Figure 9:
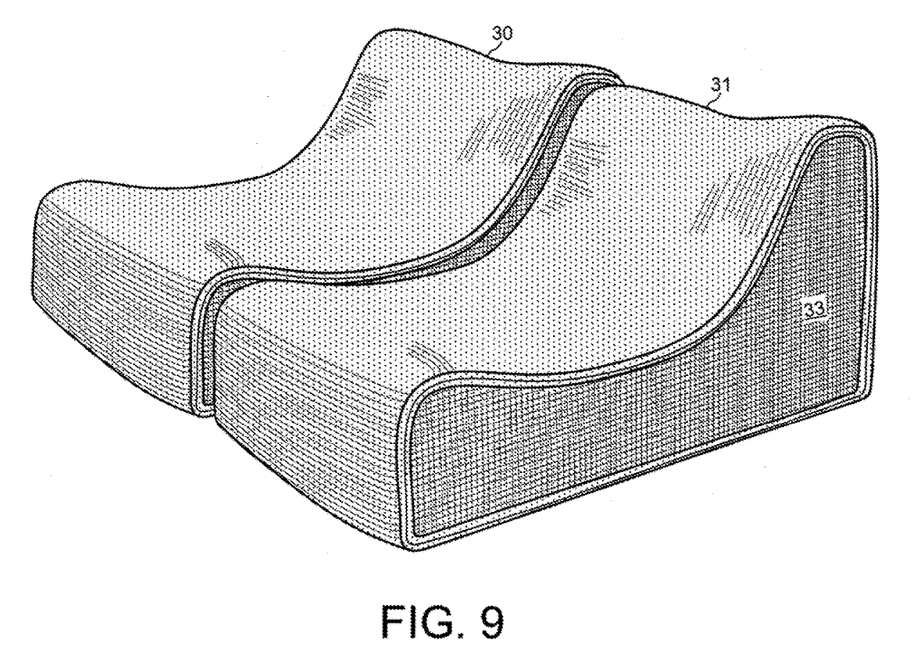
FIG. 9 is a perspective view of two modular foam seating articles shaped as chaise lounges and made in the same way as the foam seating article of FIG. 1 except that the inner hollow shell has a different shape.

FIG. 9 shows two modular foam seating articles 30-31 shaped as chaise lounges. The modular articles 30-31 can be placed together to form larger pieces of furniture, such as a sofa. Foam seating articles 30-31 are made in the same way as foam seating article 10 of FIG. 1 except that the inner hollow shell has a different shape.

Figure 10:
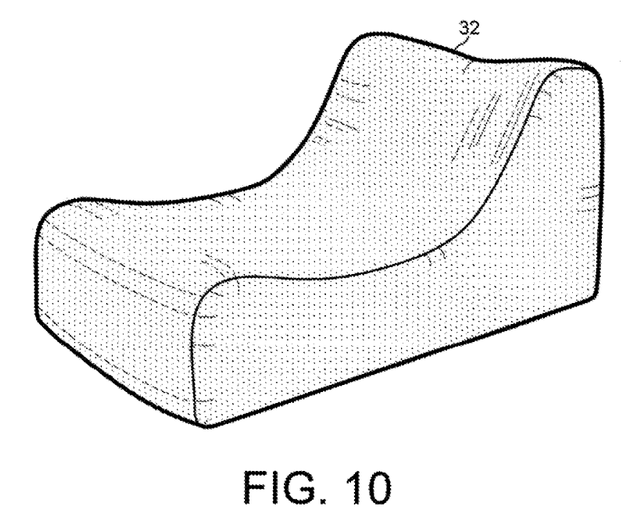
FIG. 10 is a perspective view of the inner hollow shell used to make the foam seating article of FIG. 10.

FIG. 10 shows an inner hollow shell 32 of hard plastic used to make foam seating article 31 of FIG. 9. Shell 32 is formed in the same way as shell 13 is formed by blow molding a thermoplastic resin into a first mold. A layer of foam is then molded around shell 32 using a second mold. A woven fabric covering 33 is then placed around the molded foam.

Figure 11:
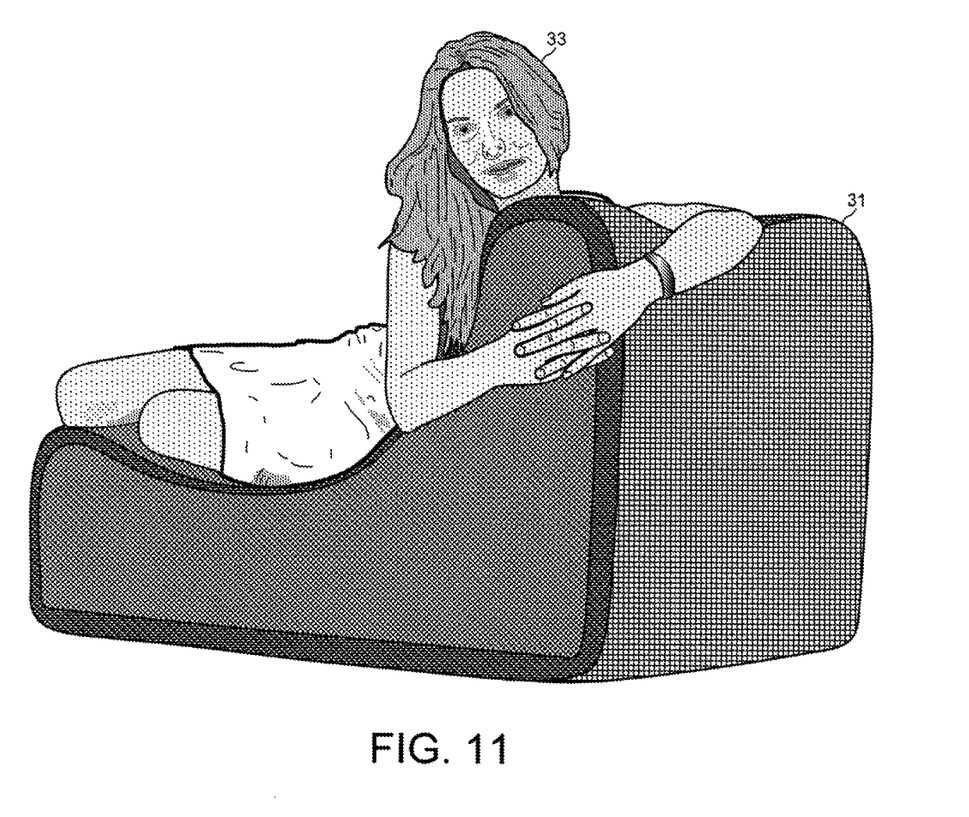
FIG. 11 is a perspective view of an occupant resting on one of the chaise lounges of FIG. 9.

FIG. 11 shows an occupant 33 resting on chaise lounge 31.

Figure 12:
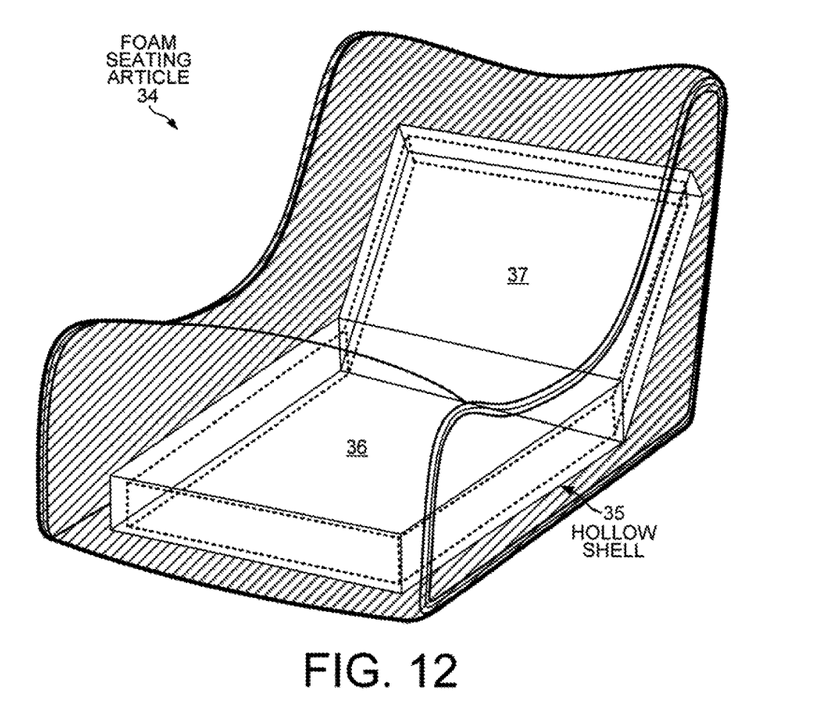
FIG. 12 is a perspective view of a foam seating article shaped as a chaise lounge as in FIG. 9 except that the inner shell is made from planar sheets of hard plastic instead of by blow molding.

FIG. 12 is a perspective view of a foam seating article 34 with a shape similar to that of chaise lounge 31. The inner hollow shell 35 of article 34, however, is not made using blow molding. Shell 35 is constructed from sheets of hard plastic that have been cut to form the planar sides of shell 35. The plastic sheets can be made of polypropylene, polyethylene, polyvinyl chloride (PVC), polyvinyl acetate (PVA) or a thermoplastic elastomer (TPE). The sides of shell 35 can be glued or melted together. Shell 35 has two portions, a bottom portion 36 and a back portion 37. Each portion 36-37 is made airtight, and the two portions are then glued together. For example, the air pressure in airtight bottom portion 36 helps to prevent the flat top from sagging under the weight of the occupant of chaise lounge 34.

Figure 13:
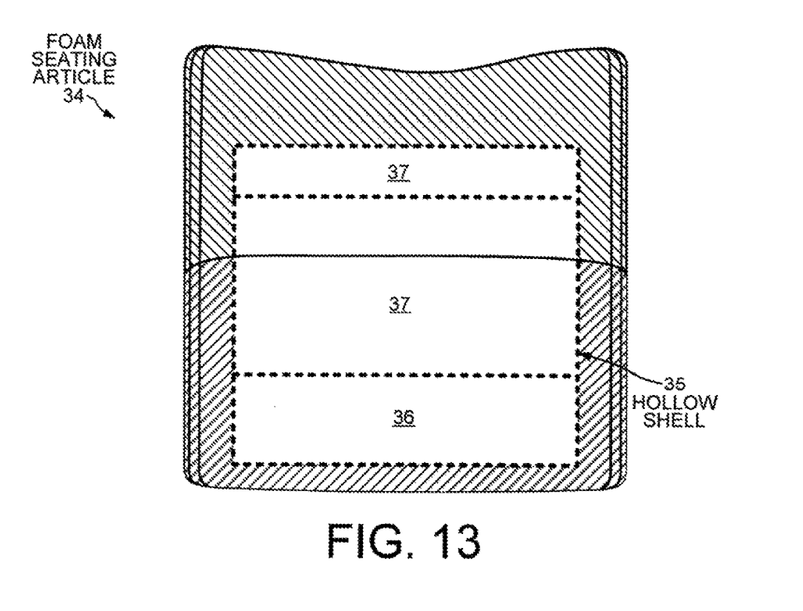
FIG. 13 is a cross-sectional view of the foam seating article of FIG. 12.

FIG. 13 is a cross-sectional view of foam seating article 34 of FIG. 12. FIG. 13 shows that the layer of molded foam that surrounds hollow shell 35 is much thicker above bottom portion 36 of shell 35 than to the sides of shell 35.

Figure 14A:
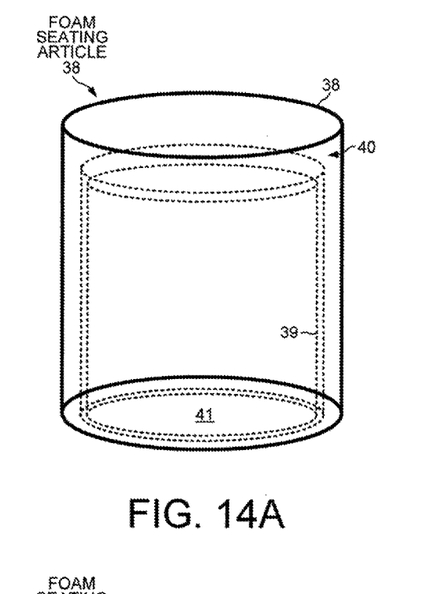
FIG. 14A is a perspective view of a foam seating article in the form of an Ottoman with an inner shell that is open at the bottom.
Figure 14B:
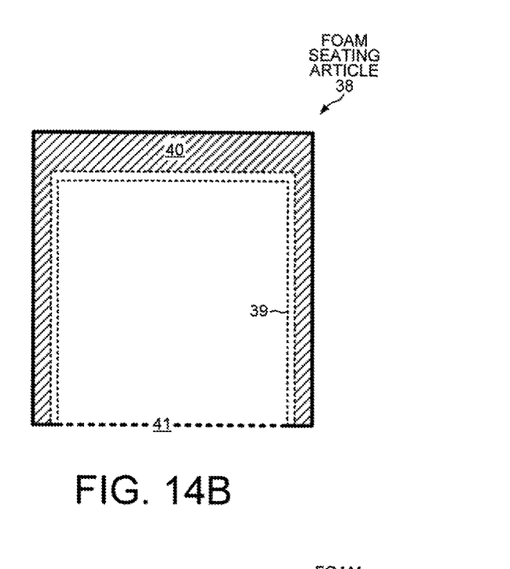
FIG. 14B is a cross-sectional view of the foam seating article of FIG. 14A.

FIGS. 14A-B show perspective and cross-sectional views of a foam seating article 38 in the form of an Ottoman, which can be used as a stool or a foot stool. Ottoman 38 has an inner hard plastic shell 39 that is open at the bottom. Shell 39 is a cylinder with one end closed. Shell 39 is formed as a single piece using injection molding instead of as an extruded tube with a planar, circular plug added separately as in the embodiment of FIG. 7. Foam 40 is then molded around shell 39 leaving the bottom end 41 of the cylindrical shell open. A fabric covering (not shown) is then placed around the molded foam 40 and shell 39. The covering covers the entire Ottoman 38, including the open bottom end 41 of shell 39.

Figure 15A:
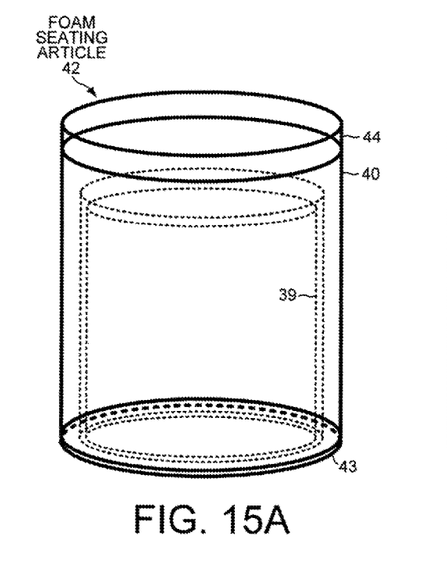
FIG. 15A is a perspective view of a foam seating article in which a hard plastic bottom disk and an upper memory foam disk have been added to the seating article of FIGS. 14A-B.
Figure 15B:
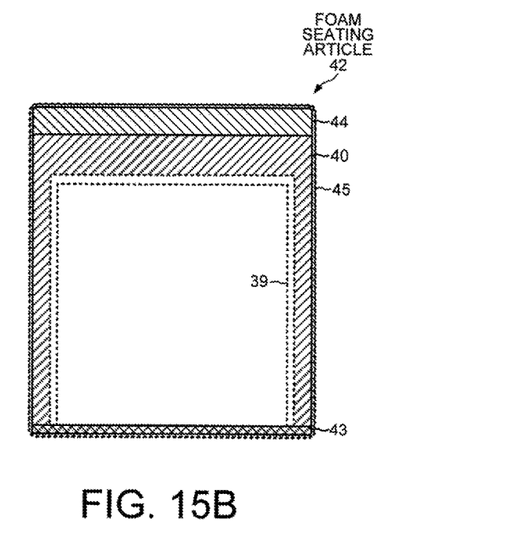
FIG. 15B is a cross-sectional view of the foam seating article of FIG. 15A.

FIGS. 15A-B show a foam seating article 42 in which a hard plastic bottom disk 43 and an upper memory foam disk 44 have been added to Ottoman 38 of FIG. 14. Hard plastic bottom disk 43 is glued over the bottom end 41 of shell 39. Disk 44 of memory foam is glued to the top of molded foam 40. A removable fabric covering 45 is then placed around foam disk 44, molded foam 40 and hard plastic bottom disk 43. The bottom circle of fabric covering 45 can be opened with a zipper to remove the covering 45 from the foam.

Figure 16:
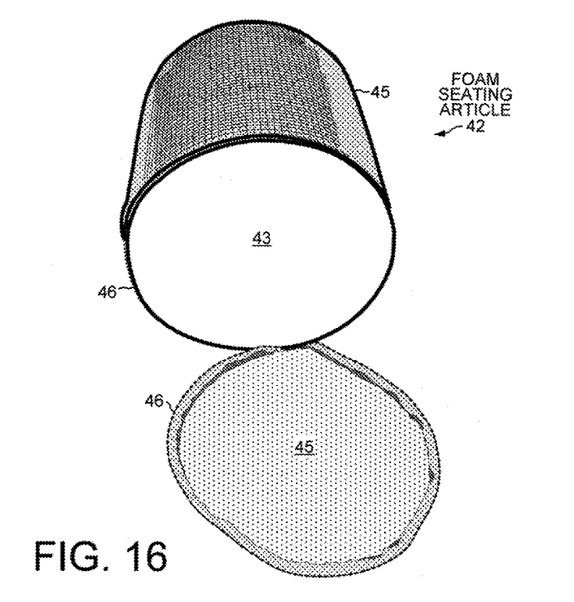
FIG. 16 is a bottom perspective view of a cylindrical foam seating article with an unzipped bottom circular flap of a fabric covering.

FIG. 16 is a bottom perspective view of foam seating article 42 with the bottom circular flap of covering 45 unzipped. A zipper 46 is sewn around the circumference of the bottom flap. When the flap is unzipped, fabric covering 45 can be slid off from the cylindrical Ottoman 42.

Figure 17A:
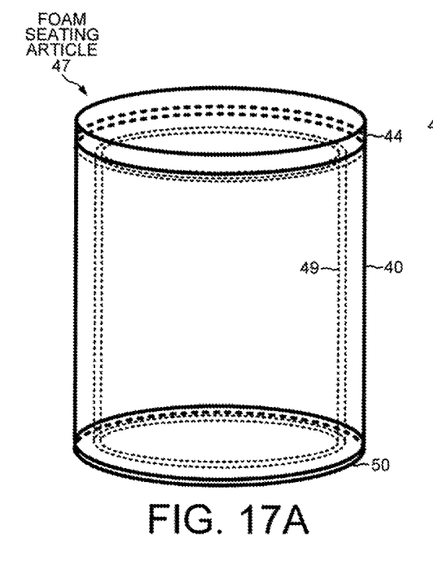
FIG. 17A is a perspective view of a foam seating article similar to that of FIG. 15 except that the top plug is removable and allows access to the hollow shell.
Figure 17B:
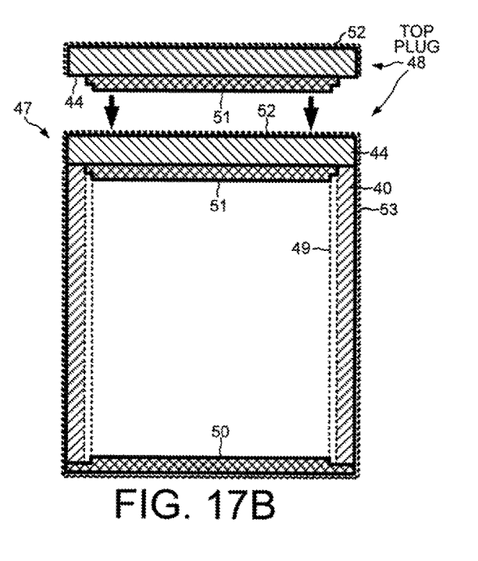
FIG. 17B is a cross-sectional view of the foam seating article of FIG. 17A.

FIGS. 17A-B show perspective and cross-sectional views of a foam seating article 47 similar to Ottoman 42 of FIG. 15. Article 47 can be used for storage, however, because the top plug 48 is removable. For example, article 47 can be used as a foot stool for a sofa, as well as a storage bin for children's toys. The shell of article 47 is a tube 49 that is capped at both ends by lipped disks 50-51. Tube 49 is a portion of an extruded polyvinyl chloride (PVC) pipe, and lipped disks 50-51 fit into the ends of tube 49. Lower disk 50 is glued to the bottom end of tube 49. A layer of molded foam 40 is molded around the sides of tube 49. Top plug 48 includes upper disk 51 to which a disk of memory foam 44 is glued. An upper portion 52 of the covering 45 fits around the top of memory foam disk 44. Upper disk 51, memory foam disk 44 and upper portion 52 of the covering 45 together form the top plug 48 and can be removed from article 47 as a unit to gain access to the cavity inside tube 49. A lower portion 53 of the covering 45 fits around molded foam 40 and lower disk 50.

Figure 18A:
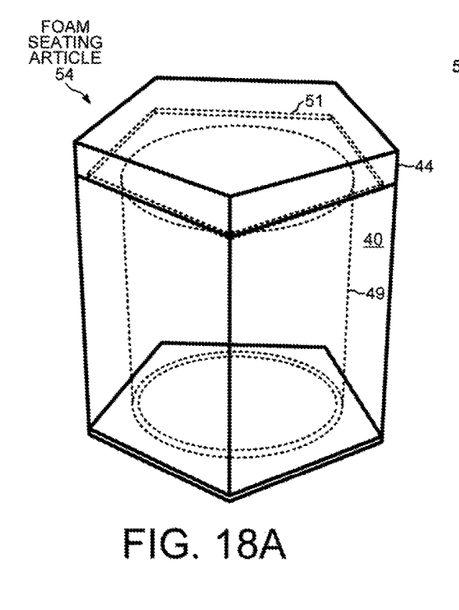
FIG. 18A is a perspective view of a foam seating article similar to that of FIGS. 17A-B except that the horizontal cross section of the outside of the molded foam layer is pentagonal instead of circular.
Figure 18B:
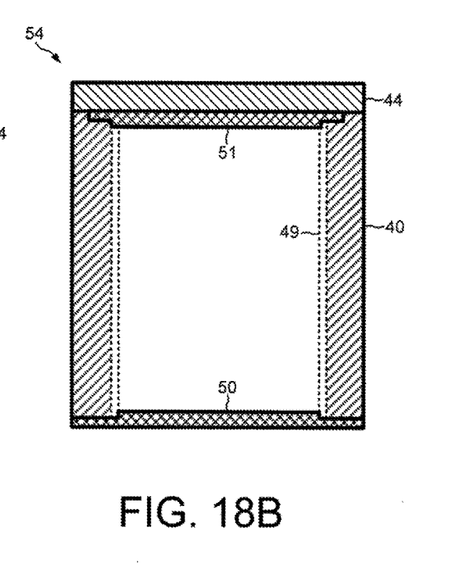
FIG. 18B is a cross-sectional view of the foam seating article of FIG. 18A.

FIGS. 18A-B show perspective and cross-sectional views of a foam seating article 54 similar to seating article 47 of FIG. 17 except for the shape of the molded foam layer 40. The horizontal cross section of the inner, hard-plastic shell is circular, whereas the horizontal cross section of the outside of molded foam layer 40 is pentagonal. Article 54 has a pentagonal top lid made up of upper disk 51, memory foam 44 and a fabric covering (not shown). Upper disk 51 has a circular bottom and a pentagonal upper lip.

Figure 19:
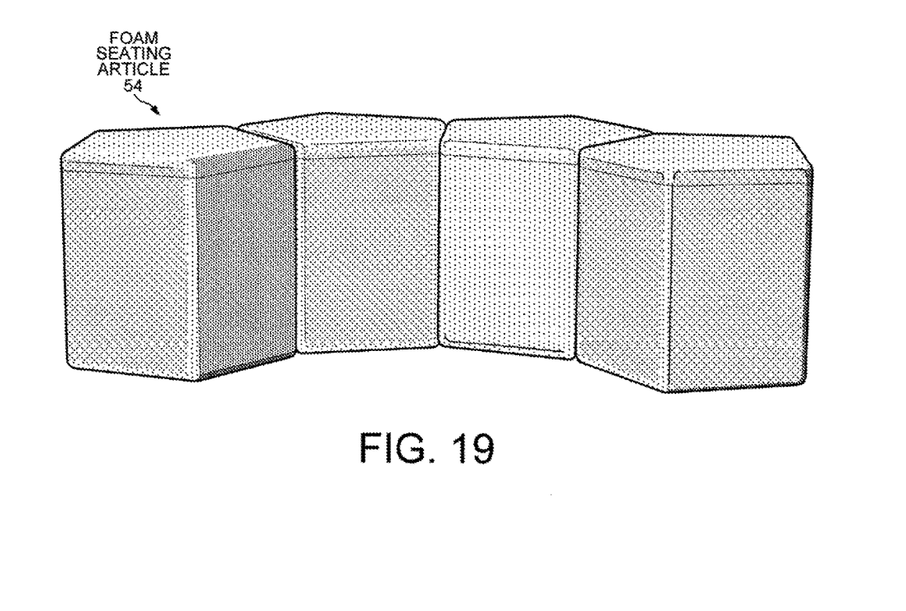
FIG. 19 is a perspective view of four modular blocks of the foam seating article of FIGS. 18A-B.

FIG. 19 shows four modular blocks of the foam seating article 54. In addition to being usable as an Ottoman together with a sofa, the blocks 54 of FIG. 19 can also be used in a children's room as stools that store toys.

Figure 20:
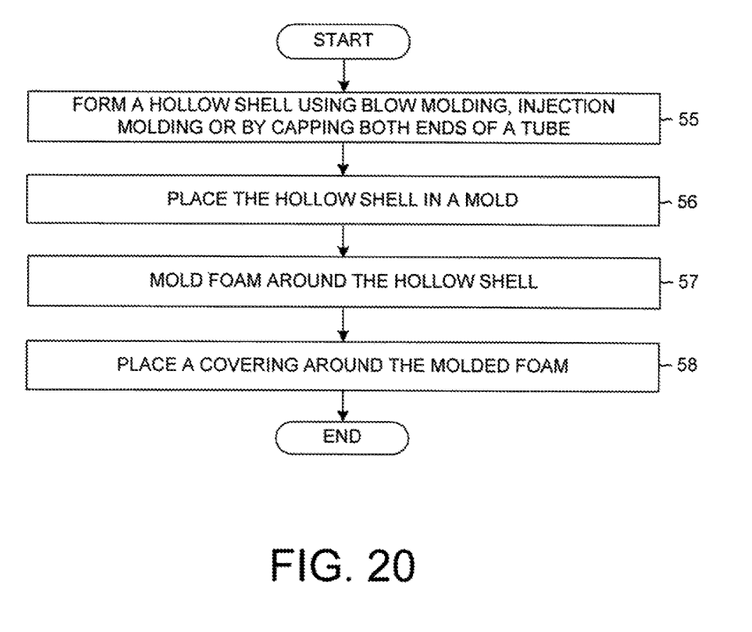
FIG. 20 is a flowchart of steps of a method of manufacturing the foam seating articles of the previous figures.

FIG. 20 is a flowchart illustrating steps 55-58 of a method of manufacturing the foam seating articles described above. Molding foam around a hard plastic shell is a simpler and less costly manufacturing process than shaping metal and wood to make a frame and then adding springs, padding and upholstery. And it is easier to make curved shapes by molding the inner shell and outer foam than it is to make a curved inner frame from wood or metal. In addition, the foam and plastic construction does not include nails that can come loose with extended use.

In a first step 55, hollow shell 13 is formed using blow molding, injection molding or by attaching disks to both ends of a tube. When blow molding is used to make hollow shell 13, a tube of plasticized resin is placed inside a first mold and then sealed at both ends. The first mold is closed, and air is blown into the tube of resin such that the resin sheet expands outwards towards the walls of the mold and takes the shape of the interior of the mold. To enhance the adhesion of foam to the outside surface of shell 13, the shell is given an uneven outer surface with dimples or grooves by providing micro-bumps or ribs on the inside surface of the first mold. The resin tube is then cured. The first mold is opened, and the cured resin shell 13 is removed from the mold.

In step 56, the hollow shell 13 is placed in second mold 15. Shell 13 must be supported inside second mold 15 so that the shell does not sit at the bottom of the mold and so that there is spacing between shell 13 and all of the inside walls of second mold 15.

In step 57, foam is molded around the outer surface of hollow shell 13. Liquid foam precursors are injected into the space between shell 13 and the inner walls of second mold 15. Different kinds of foams can be successively poured into second mold 15. For example, the precursors of an extra hard foam with an ILD of about twenty are first added to fill the bottom several inches of space 18 in second mold 15. Then the precursors of HD polyurethane foam with an ILD of about fifteen are added until about the bottom half of space 18 is filled. Finally, memory foam is poured into the remaining space 18 between shell 13 and the inner mold walls. The memory foam has an ILD of about twelve. The liquid foam precursors of the molded foam layer 19 are cured, and the foam with shell are removed from the second mold 15.

In step 58, covering 12 is then placed around molded foam layer 19 and hollow shell 13. Covering 12 is made of woven fabric, nonwoven fabric, leather or a conformal plastic or rubber layer. For example, foam seating article 54 of FIG. 19 can be given a conformal rubber covering by dipping the foam layer 40 and shell into a synthetic rubber bath.

Although certain specific exemplary embodiments are described above in order to illustrate the invention, the invention is not limited to the specific embodiments. Accordingly, various modifications, adaptations, and combinations of various features of the described embodiments can be practiced without departing from the scope of the invention as set forth in the claims.

What is claimed is:

1. A method of making a cushioned seating article, comprising:
    forming a hollow shell of hard plastic using blow molding, wherein the hollow shell completely encloses a hollow cavity, and wherein the hollow shell has an outer surface;
    placing the shell in a mold;
    molding a layer of foam completely around the hollow shell such that the entire outer surface of the hollow shell is covered by the molded foam, wherein the molded foam has an indentation load deflection of twenty or less; and
    placing a covering around the molded foam and the shell.

2. The method of claim 1, wherein the shell is made of a plastic taken from the group consisting of: polypropylene, polyethylene, polyvinyl chloride, polyvinyl acetate and a thermoplastic elastomer.

3. The method of claim 1, wherein the foam is taken from the group consisting of: high density (HD) foam, memory foam and latex.

4. The method of claim 1, wherein the forming the hollow shell involves sealing a sheet of flexible resin in a mold, blowing air into the sheet such that the sheet takes the shape of the interior of the mold, and curing the sheet.

5. The method of claim 1, wherein the covering is taken from the group consisting of: a woven fabric, a nonwoven fabric and leather.

6. The method of claim 1, wherein the hollow shell is polypropylene with a thickness of three millimeters or less.

7. The method of claim 1, wherein the cushioned seating article includes no wood or metal.

8. The method of claim 1, wherein the layer of foam includes sections of different foam types.

9. The method of claim 1, wherein the outer surface of the hollow shell is uneven and has dimples, and wherein the molded foam is molded into the uneven outer surface.

10. The method of claim 1, wherein the hollow shell is a tube that is capped at both ends.

11. A method of making a cushioned seating article, comprising:
    forming a hollow shell of hard plastic using blow molding, wherein the hollow shell completely encloses a hollow cavity, wherein the hollow shell is airtight, and wherein the hollow shell has an outer surface;
    placing the shell in a mold;
    molding a layer of foam completely around the hollow shell such that the entire outer surface of the hollow shell is covered by the molded foam, wherein the molded foam has an indentation load deflection of twenty or less; and
    placing a covering around the molded foam and the shell.

12. A method comprising:
    forming a hollow shell of hard plastic, wherein the hollow shell completely encloses a hollow cavity, and wherein the hollow shell has an outer surface;
    placing the shell in a mold;
    molding a layer of foam completely around the hollow shell such that the entire outer surface of the hollow shell is covered by the molded foam, wherein the molded foam has hardness of less than 20 Shore A; and
    placing a covering around the molded foam and the hollow shell.

13. The method of claim 12, wherein the molded foam has an indentation load deflection of twenty or less.

14. The method of claim 12, wherein the hollow shell is polypropylene with a thickness of three millimeters or less.

15. The method of claim 12, wherein the hollow shell is airtight.

16. The method of claim 12, wherein the molded foam is memory foam.

17. The method of claim 12, wherein the forming the hollow shell involves sealing a sheet of flexible resin in a mold, blowing air into the sheet such that the sheet takes a shape of an interior of the mold, and curing the sheet.

18. The method of claim 12, wherein the covering is taken from the group consisting of: a woven fabric, a nonwoven fabric and leather.

19. The method of claim 12, wherein the layer of foam includes sections of different foam types.

20. The method of claim 12, wherein the outer surface of the hollow shell is uneven and has dimples, and wherein the molded foam is molded into the uneven outer surface.

\* \* \* \* \*